Jan. 23, 1940.   H. BERTHOLD   2,188,071
DIRECTION FINDING RADIO SYSTEM
Filed Jan. 25, 1938
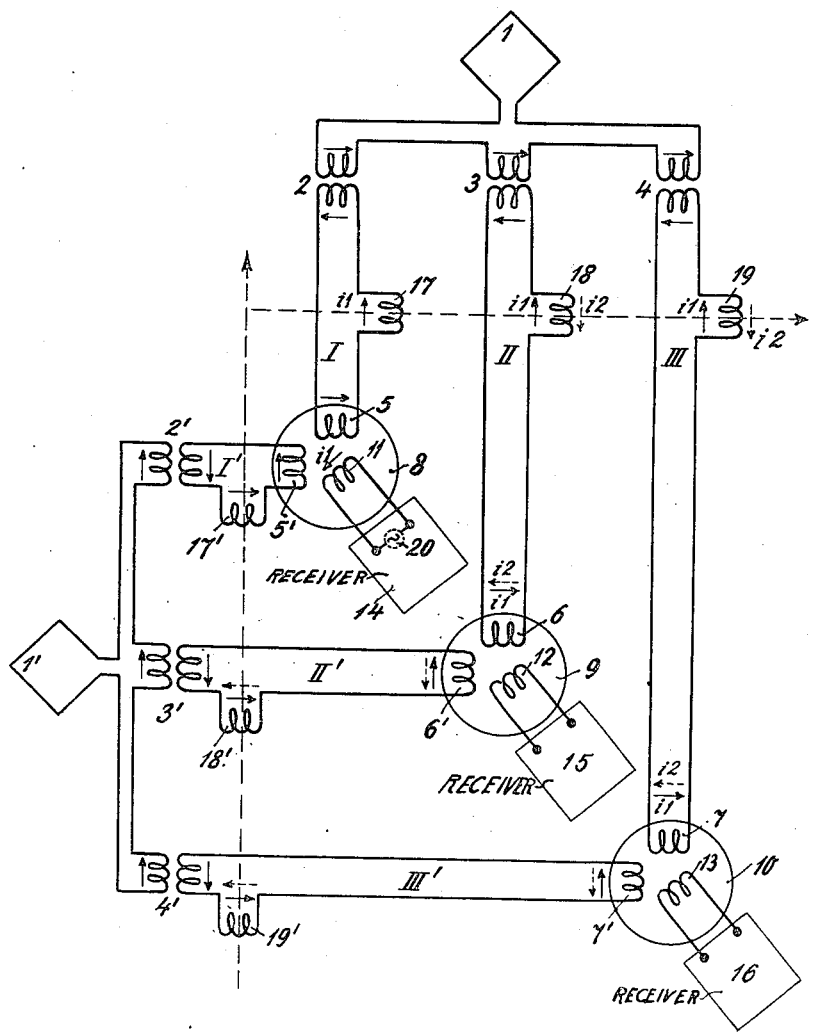
*Inventor:*
*Hans Berthold*
by R. C. Hapgood
*Attorney*

Patented Jan. 23, 1940

2,188,071

UNITED STATES PATENT OFFICE 2,188,071

DIRECTION FINDING RADIO SYSTEM

Hans Berthold, Berlin, Germany, assignor to C. Lorenz Aktiengesellschaft, Berlin-Tempelhof, Germany, a company Application January 25, 1938, Serial No. 186,781
In Germany January 29, 1937

3 Claims. (Cl. 250—11)

The invention has for its object to suppress errors that tend to occur if a cross-coil aerial or an Adcock or similar directional antenna system is arranged to be utilized by a number of goniometers, such errors being due to the goniometers influencing each other.

Various methods have been employed in order to neutralize this retroactive influence. For instance, it has been proposed to make use of an auxiliary arrangement which comprises a cross-coil aerial and goniometers, thus being similar to the direction finding system proper, and which is located in symmetric relation therewith in order to compensate the said detrimental retroactive effects by producing effects of the same but opposing magnitude. This mode, however, has the drawback that the provision of an auxiliary cross-coil aerial connection, suitable for a large frequency range, is not practicable here, and further, that expensive double goniometers are needed.

Also, in order to do away with the said retroaction, attempts have been made to minimize the coupling degree between the search coil and field coils of each goniometer. However, this mode has the detrimental disadvantage that the voltage induced in the search coil is very small, the sharpness of the obtained bearings thus being insufficient.

All these disadvantages are overcome by the invention described hereafter. This invention with the aid of simple means allows of doing away with the said retroaction and does not entail a decrease in the search coil voltage so that the sharpness of the obtained bearings will continue to be of the normal value.

The invention will be understood from the following description, reference being had to the accompanying drawing which is a wiring diagram of one embodiment thereof.

The arrangement here shown by way of example has a cross-coil aerial which comprises two loops 1, 1' arranged to intersect at right angles, and which is to be utilized by three goniometers 8, 9, 10, three goniometer circuits I, I'; II, II'; III, III' being connected to the loops 1, 1'. The high frequency voltage passes over transformers 2, 3, 4 and 2', 3', 4' into the field coils 5, 6, 7 and 5', 6', 7' of the goniometers 8, 9, 10. The coils 5, 5' are offset at right angles with respect to each other, as are also coils 6, 6' and 7, 7'. The search coils 11, 12, 13 of the goniometers are connected to the direction finding receivers 14, 15, 16. In the circuits I, I', II, II', III, III' coupling members 17, 18, 19, 17', 18', 19' are included in addition to the field coils 5 to 7'. The members 17, 18, 19, and members 17', 18', 19' as well, are coupled to each other. The coupling degree thereof is adjusted to meet the retroactive voltages that tend to become effective.

If receiver 14 has been tuned to some transmitter then the direction of this is ascertained by means of goniometer 8. In such case a high frequency voltage arrives from the loops 1, 1' over the transformers 2, 2' in the coils 5, 5' which act to induce a voltage in coil 11. In this coil therefore a current $i1$ is flowing, the intensity and direction of which is represented by the arrow shown at $i1$. In order well to comprehend the mode of action, this current may be assumed to be produced by a generator 20 working upon the terminals of coil 11. Current $i1$ is by the coils 5, 5' and transformers 17, 18, 19, 17', 18', 19' rendered effective in the goniometer circuits II, III, II', III', as indicated by the arrows shown at $i1$, the said retroactive influence upon the goniometers 9, 10 being brought about in this way.

In accordance with the invention the coupling of the members 17, 18, 19 and that of 17', 18', 19' is such that in the goniometer circuits currents $i2$ shall flow in the opposite direction to that of the retroactive currents $i1$, thus doing away with any detrimental currents that tend to influence the goniometers. These compensating currents are represented by dotted arrows.

For simplicity it has been assumed here that the circuit I, I' is reacting upon the circuits II, II' and III, III'. In reality the state of things is more complicated, since each circuit is reacting upon each of the other circuits. The resultant effects are, however, based on the conditions described by way of simplification and therefore need no special consideration.

What is claimed is:

1. A direction finding radio system comprising, two directional antenna circuits, a plurality of radio goniometers each consisting of two field coils and field coil circuits and one search coil circuit and having one of said field coil circuits operatively associated with one of said directional antenna circuits and the second of said field coil circuits operatively associated with the second of said antenna circuits, and coupling means mutually coupled with each other and interposed in said field coil circuits between their actual field coils and said directional antenna circuits so as to induce potentials in said field coil circuits which potentials produce currents of equal amplitude but of opposite phase with respect to reactive currents resulting from the mutual influence upon one another of said radio goniometers.

2. A direction finding radio system as defined in claim 1, in which the coupling means in said field coil circuits comprise induction coils.

3. A direction finding radio system as defined in claim 1, in which said goniometer field coil circuits are coupled to the two directional antenna circuits by means of transformers.

HANS BERTHOLD.